US007326453B2

(12) United States Patent
Windorski

(10) Patent No.: US 7,326,453 B2
(45) Date of Patent: Feb. 5, 2008

(54) ARTICLE WITH SELECTIVELY ACTIVATED ADHESIVE

(75) Inventor: David C. Windorski, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 160 days.

(21) Appl. No.: 10/772,190

(22) Filed: Feb. 4, 2004

(65) Prior Publication Data

US 2005/0170174 A1 Aug. 4, 2005

(51) Int. Cl.
*B32B 9/00* (2006.01)
*G09F 1/04* (2006.01)

(52) U.S. Cl. .............................. 428/42.3; 40/124.191; 40/641; 40/675

(58) Field of Classification Search ................. 40/380, 40/1, 124.01, 124.02, 124.03, 124.04, 124.05, 40/124.06, 124.07, 124.08, 124.09, 124.11, 40/124.12, 124.13, 124.14, 124.15, 124.16, 40/124.17, 124.18, 124.19, 124.191, 359, 40/360, 675; 428/40.1, 42.1, 42.2, 192, 194, 428/343, 354, 77, 211.1, 42.3; 462/62, 63, 462/900, 901; D19/1, 2, 5, 6, 9, 10, 19, 65, D19/99

See application file for complete search history.

(56) References Cited

U.S. PATENT DOCUMENTS

| | | | |
|---|---|---|---|
| 3,265,555 | A | 8/1966 | Dalton |
| 3,314,838 | A | 4/1967 | Erwin |
| 3,517,106 | A | 6/1970 | Chase |
| 3,853,129 | A | 12/1974 | Kozak |
| 4,376,440 | A | 3/1983 | Whitehead et al. |
| 4,556,595 | A | 12/1985 | Ochi |
| 4,713,901 | A | 12/1987 | Wells et al. |
| 4,959,265 | A | 9/1990 | Wood et al. |
| 4,995,641 | A | 2/1991 | Landry et al. |
| 5,008,139 | A | 4/1991 | Ochi et al. |
| 5,153,041 | A | 10/1992 | Clements et al. |
| 5,318,825 | A | 6/1994 | Naber |
| 5,344,693 | A | 9/1994 | Sanders |
| 5,453,296 | A | 9/1995 | Lauritzen et al. |
| 5,458,938 | A | 10/1995 | Nygard et al. |
| 5,487,929 | A | 1/1996 | Rusincovitch, Jr. et al. |
| 5,522,622 | A | 6/1996 | Segar |
| 5,589,246 | A | 12/1996 | Calhoun et al. |
| 5,662,758 | A | 9/1997 | Hamilton et al. |
| 5,906,883 | A | 5/1999 | Blanc-Brude |
| 5,948,494 | A | 9/1999 | Levin |
| 5,965,235 | A | 10/1999 | McGuire et al. |
| 5,968,633 | A | 10/1999 | Hamilton et al. |
| 6,083,616 | A | 7/2000 | Dressler |
| 6,194,062 | B1 | 2/2001 | Hamilton et al. |
| 6,254,965 | B1 | 7/2001 | McGuire et al. |
| 6,299,966 | B1 | 10/2001 | Bonke et al. |
| 6,489,022 | B1 | 12/2002 | Hamilton et al. |
| 6,541,098 | B2 | 4/2003 | Venkatasanthanam et al. |
| 6,565,697 | B1 | 5/2003 | Maercklein |
| 6,602,580 | B1 | 8/2003 | Hamilton et al. |
| 6,769,829 | B1 | 8/2004 | Castillo et al. |
| 6,858,285 | B1 | 2/2005 | Hamilton et al. |
| 2002/0081411 | A1 | 6/2002 | Hamilton et al. |
| 2002/0089171 | A1 | 7/2002 | Silvestre |
| 2003/0082345 | A1 | 5/2003 | Hamilton et al. |
| 2003/0121586 | A1 | 7/2003 | Mitra et al. |
| 2003/0124291 | A1 | 7/2003 | Ausen et al. |
| 2003/0211270 | A1 | 11/2003 | McReynolds et al. |
| 2003/0232190 | A1 | 12/2003 | O'Leary et al. |
| 2004/0137202 | A1 | 7/2004 | Hamilton et al. |
| 2005/0276953 | A1 | 12/2005 | Kitchin |
| 2005/0276971 | A1 | 12/2005 | Kitchin |
| 2006/0188710 | A1 | 8/2006 | Windorski et al. |
| 2006/0210792 | A1 | 9/2006 | Windorski et al. |

FOREIGN PATENT DOCUMENTS

| | | |
|---|---|---|
| EP | 0 442 217 | 8/1991 |
| GB | 1 053 292 | 12/1966 |
| JP | 2001/1191672 | 7/2001 |
| WO | WO 2004/039683 | 5/2004 |
| WO | 2005/077672 | 8/2005 |
| WO | WO 2006/001889 | 1/2006 |

OTHER PUBLICATIONS

American Society for Healthcare Risk Management, "Strategies and Tips for Maximizing Failure Mode and Effect Analysis in Your Organization", WHITEPAPER, 12 pages (Jul. 2002).

*Primary Examiner*—Terrel Morris
*Assistant Examiner*—Anish Desai

(57) ABSTRACT

An index card assembly which allows selective adherence of an index card to a mounting surface is disclosed. A base paper layer of the index card has a front side and an opposite back side. The paper layer has an upper edge with a portion of the paper layer removed to define a paperless zone which includes a gap across the upper edge. A cover layer having an outer face and an inner face is adhered by pressure sensitive adhesive disposed on its inner face to the front side of the paper layer. The cover layer is aligned to cover the paperless zone with a top of the cover layer extending across the gap of the paperless zone. The adhesive on the inner face of the cover layer is exposed across the paperless zone on the back side of the paper layer. The thickness of the paper layer prevents the adhesive from contacting a surface abutting the back side of the paper layer in the absence of the application of a threshold level of pressure against the outer face of the cover layer.

1 Claim, 7 Drawing Sheets

ARTICLE WITH SELECTIVELY ACTIVATED ADHESIVE

CROSS-REFERENCE TO RELATED APPLICATION(S)

None

BACKGROUND OF THE INVENTION

This invention relates to articles which can be selectively secured to a mounting substrate by pressure sensitive adhesive. More particularly, this invention relates to a substrate such as an index card having a writeable surface on one side and a mounting surface on a second opposite side, with a securing mechanism operable via a pressure threshold adhesive mechanism which is selectively exposed on the mounting side of the first substrate. Dependent upon a level of threshold pressure applied to the securing mechanism, the exposed pressure sensitive adhesive is either spaced from the mounting substrate or the article is deformable to bring the pressure sensitive adhesive into article securing engagement with the mounting substrate.

Memories are imperfect. Thus, we often write down things we want to remember at later date. This may be a grocery list, a "to do" list, a speech, study notes, or other information we do not want to forget. For example, a student may take a series of blank index cards and turn them into "flash cards" by writing information on one (or both) sides of each card in preparing for an examination. An individual giving a speech may record notes for that speech on a series of index cards which can be stacked and easily transported or even pocketed. Post-it® brand notes available from 3M Company have also proved quite useful for noting information to be recalled at a later date. A Post-it® brand note is a sheet of paper bearing a band of repositionable pressure sensitive adhesive across a back side thereof. A Post-it® brand note can be mounted on any number of surfaces, such as, for example, another sheet of paper, a wall, a mirror, a computer monitor, a refrigerator door, etc. Post-it® brand notes are traditionally distributed in pad form, with adjacent notes adhered to one another by the repositionable pressure sensitive adhesive thereon. The notes stick together whenever placed adjacent one another, and thus are not easily shuffled or rearrangeable in stacked form without peel separation of the adhesive therebetween.

Index cards come traditionally in 3×5 inch or 4×6 inch formats and are typically made from stiff, more durable paper than note paper. There is no adhesive on an index card and it is easily shuffled among a stack of index cards. To stick an index card on a wall or other surface, adding a separate strip of tape may be used. However, it would be desirable to selectively adhere an index card to a surface (such as a wall, sheet of paper or the like) yet retain the ability to shuffle a stack of such index cards (i.e., not have adjacent index cards always adhere together) without having to go to the trouble of removing a tape strip from each index card.

BRIEF SUMMARY OF THE INVENTION

An article which may be selectively secured to a mounting surface includes at least a first substrate having a writeable surface on one side thereof and a mounting surface on a second opposite side thereof. The article also includes a securing mechanism including a pressure threshold adhesive mechanism which includes pressure sensitive adhesive exposed on the second side of the first substrate. In the absence of a threshold level of pressure applied to the securing mechanism, the pressure sensitive adhesive is spaced from the mounting substrate. The article is deformable such that a threshold level of pressure applied to the securing mechanism brings the pressure sensitive adhesive into article securing engagement with the mounting substrate.

While the above drawing figures set forth several embodiments of the invention, other embodiments are also contemplated, as noted in the discussion. In all cases, this disclosure presents the invention by way of representation and not limitation. It should be understood that numerous other modifications and embodiments can be devised by those skilled in the art which fall within the scope and spirit of the principles of this invention. The figures may not be drawn to scale. Like reference numbers have been used throughout the figures to denote like parts.

DETAILED DESCRIPTION

Figure 1:
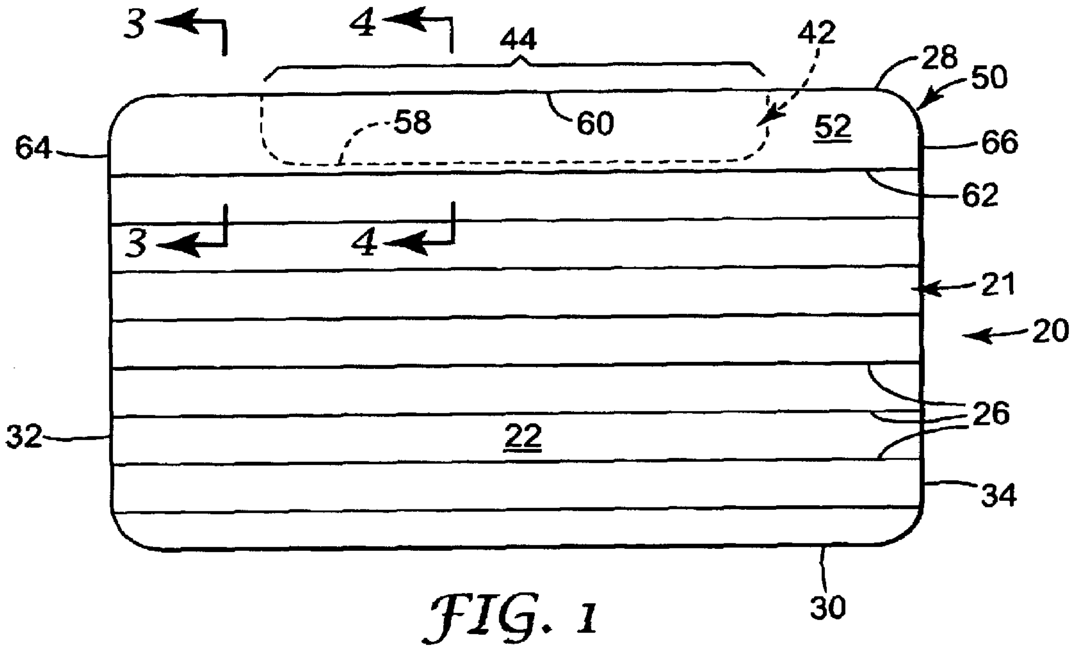
FIG. 1 is an embodiment of the present invention, in the form of an index card, as viewed from a front major side thereof.
Figure 2:
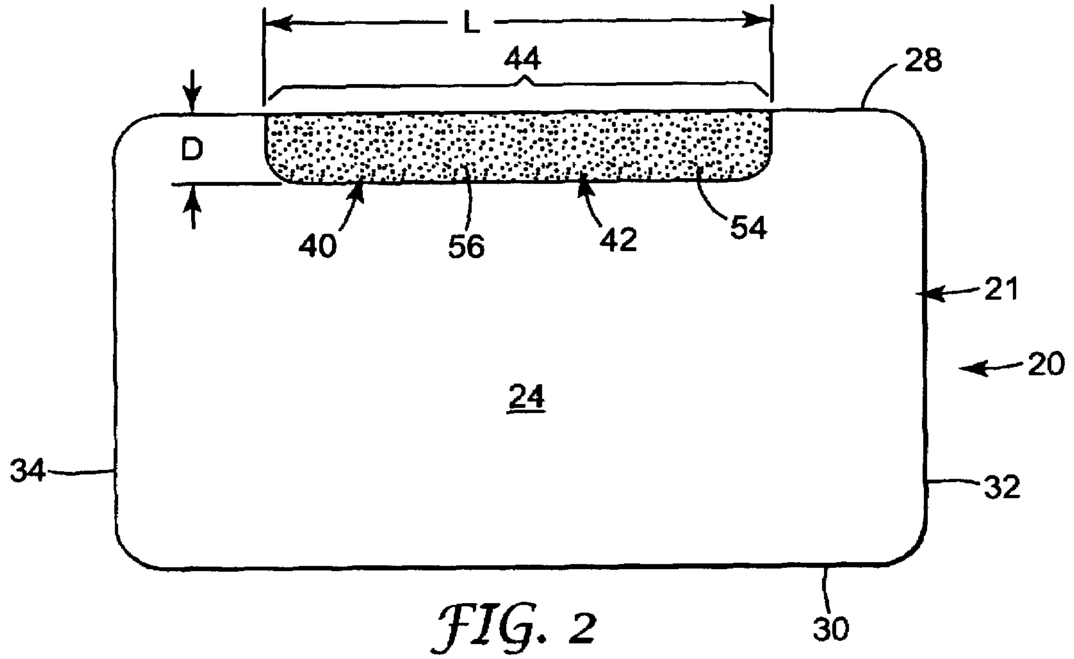
FIG. 2 is a view of the index card of FIG. 1, from an opposite back major side thereof.

In sheet form, a substrate has two major sides. FIGS. 1 and 2 illustrate a sheet in the form of an index card 20 defined by a base layer 21 of material having a front side 22 and an opposite back side 24. Typically, both sides are writeable, i.e., adapted to accept writing or other indicia from a pencil, pen, high lighter, crayon, or from other indicia forming articles such as a printer. An index card will typically have, on one side (such as front side 22), a plurality of ruled lines 26 pre-printed thereon. The base layer 21 has an upper edge 28, lower edge 30, and left and right side edges 32 and 34, respectively.

A typical index card is made of paper, such as 90 pound weight paper, and is 0.0075 inches thick. Index cards come in two typical sizes, 3×5 inches and 4×6 inches. An index card may have rounded edges (such as illustrated in FIGS. 1 and 2), or may have squared off corners.

The base layer 21 may be formed from sheet material such as paper, card stock, cardboard, plastic film, or some combination or laminate of such materials. Adjacent its upper edge 28, the layer 21 has a portion 40 removed therefrom to define an aperture therethrough which constitutes a paperless zone 42. This paperless zone 42 may take a number of forms, as illustrated herein. In one embodiment, the paperless zone 42 has a depth D and is elongated along upper edge 28 and includes an edge gap 44 of length L. In the embodiment illustrated in FIGS. 1 and 2, the paperless zone 42 is centered across the upper edge 28 of the base layer 21.

Figure 3:
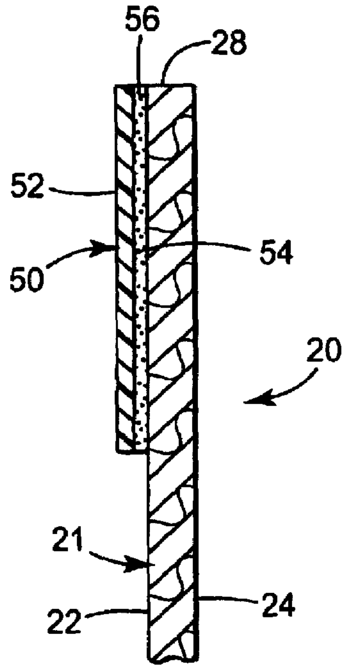
FIG. 3 is a sectional view as taken along lines 3-3 in FIG. 1.
Figure 4:
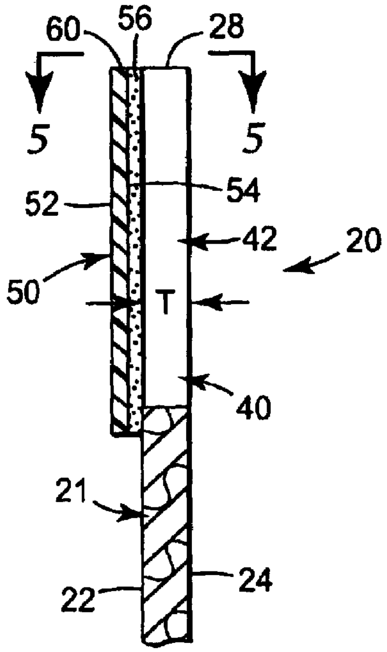
FIG. 4 is a sectional view as taken along lines 4-4 in FIG. 1.

A cover layer 50 is adhered to the front side 22 of the base layer 21 of the index card 20 and extends over the paperless zone 42. The cover layer 50, as seen in FIGS. 3 and 4, has an outer pressure face 52 and an inner adhesive face 54, and a layer of pressure sensitive adhesive 56 is disposed on the inner face 54. The pressure sensitive adhesive 56 serves to adhere the cover layer 50 to the front side 22 of the base layer 21 of the note card 20, over and across the paperless zone 42 (which is shown in outline form by dashed lines 58 under cover layer 50 in FIG. 1). The cover layer 50 has a top edge 60 and a bottom edge 62, along with left and right edges 64 and 66, respectively. The top edge 60 of the cover layer 50 is aligned to extend across the edge gap 44 of the paperless zone 42, as illustrated in FIGS. 1, 2, 4 and 5.

A thickness T (FIG. 4) of the base layer 21 is sufficient, in the paperless zone 42, to space or separate the exposed adhesive 56 on the inner face 54 of the cover layer 50 from another surface contacting the back side 24 of the base layer 21. Thus, the inventive index card 20 can be handled and moved across a surface such as a sheet of paper, a desktop, a countertop, or other like index cards without adhering thereto via the exposed adhesive 56. This non-stick feature is also dependent, to some degree, upon the fact that the cover layer 50 does not sag appreciably (if at all) into the paperless zone 42 and toward the back side 24 of the base layer 21, even though it is unsupported across the paperless zone 42 and the edge gap 44 across the upper edge 28 of the base layer 21. In one embodiment, the upper edge 28 of the base layer 21 and the top edge 60 of the cover layer 50 are co-linear.

Figure 6:
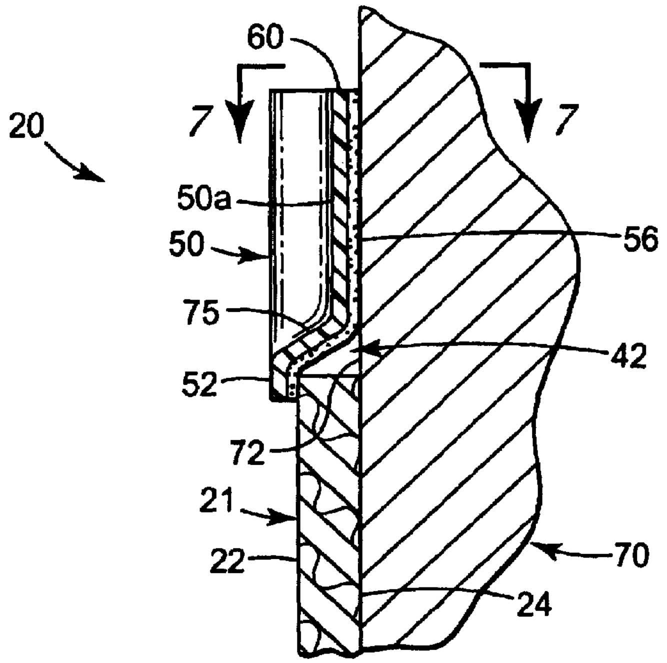
FIG. 6 is a sectional view of the index card of FIG. 4, showing its adherence to a vertical substrate surface.
Figure 7:
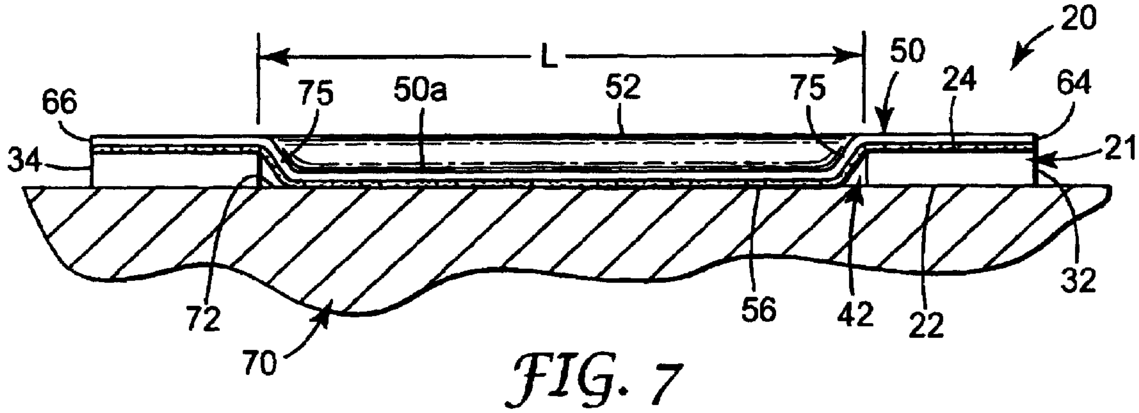
FIG. 7 is a top view of the index card and substrate of FIG. 6, as taken along lines 7-7 in FIG. 6.

The layered arrangement disclosed above defines an index card assembly having a securing mechanism for allowing selective adherence of the index card 20 to a mounting substrate. As seen in FIGS. 6 and 7, a substrate 70 has a mounting surface 72. The thickness T of the base layer 21 prevents adherence of the exposed adhesive 56 in the paperless zone 42 to the mounting surface 72 in the absence of a threshold level of pressure applied against the outer face 52 of the cover layer 50 within the area defined by the paperless zone 42. However, when such a threshold level of pressure is so applied, the cover layer 50 is sufficiently flexible and deformable so that at least a portion of the exposed adhesive 56 is brought into abutting engagement with the mounting surface 72 to adhere thereto. This relationship is illustrated in FIGS. 6 and 7. The pressure applied would typically be manual, such as by pressing against the outer face 52 of the cover layer with a finger or thumb of a user. This externally applied compressive force would typically be exerted in a direction substantially normal to the cover layer 50 and is, of course, to create an adhesion peel force of adhesive 56 after activation by the user which is greater than the adhesion peel force (which is zero) exhibited prior to activation by the user, and which is sufficient to adhere the index card to a target mounting surface. The threshold level of pressure can vary, dependent upon the nature of the material of the cover layer 50 (e.g., its resiliency), the thickness T of the base layer 21 in the paperless zone 42, the aggressiveness of the adhesive 56 and the nature of the mounting surface 72 of the substrate 70, among other things. In one embodiment, the threshold level of pressure refers to the kind of pressure an average user would normally apply using a finger or hand to adhere a pressure sensitive adhesive coated film, such as a strip of Scotch® brand adhesive tape, to a generally smooth surface such as a sheet of paper, a wall or a countertop. The target surface does not necessarily have to be flat. For example, it may be curved such as a pipe, TV screen or coffee cup.

Figure 8:
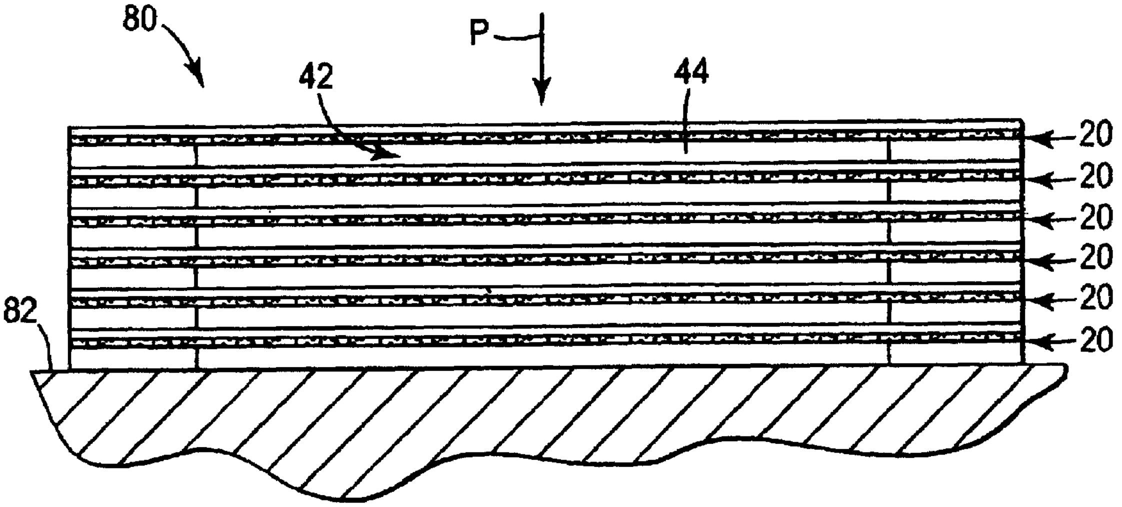
FIG. 8 is a side elevational view of a stack of index cards such as the index card illustrated in FIGS. 1-7, sitting on a horizontal substrate surface with the exposed adhesive on each index card not activated.

The deformed portion of the cover layer 50 is shown as portion 50*a*, which is deformed or bowed at edge portions 75 to bring the adhesive 56 thereon into adhering engagement with the mounting surface 72. In this manner, the index card 20 may be affixed to a wall, window or other vertically oriented surface and will be retained there by the adhesive 56. Thus, one can stick an index card up for study or memory purposes. Upon removal of the index card 20 from the substrate 70, the cover layer 50 reverts to the form illustrated in FIGS. 4 and 5, thereby again spacing the adhesive 56 from the back side 24 of the base layer 21. The index card 20 can then be placed in a stack 80 of note cards 20, such as illustrated in FIG. 8 (or even shuffled among other like index cards) without the index cards sticking to each other or to a horizontal surface 82 upon which the stack 80 may be placed. In FIG. 8, the index cards 20 have been arranged top to bottom, and are viewed from the top edges of the index cards 20, thereby illustrating the paperless zone 42 and edge gap 44 of each index card 20. When in this orientation, firm pressure applied across the stack 80 (such as illustrated by pressure P in FIG. 8) would cause all the index cards 20 in the stack 80 to stick together, with adjacent cover layers 50 in adherence via exposed adhesive 56.

Figure 5:
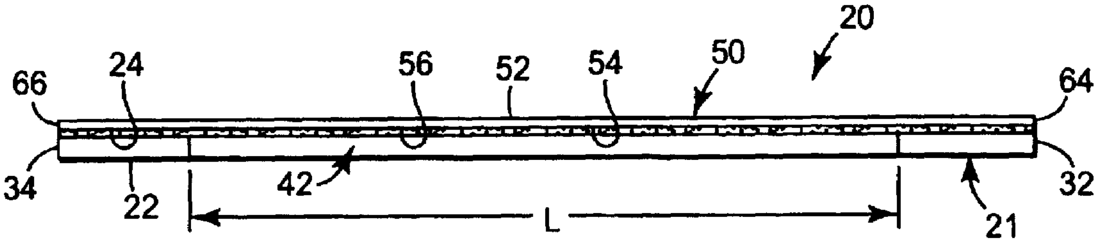
FIG. 5 is top view of the index card of FIG. 4, as taken along lines 5-5 in FIG. 4.

In one embodiment, the cover layer 50 is formed from a polymer film which is deformable upon application of the threshold level of pressure to urge the adhesive 56 thereon into contact with a mounting surface (as seen in FIGS. 6 and 7). Upon release of that pressure (and peel release of the adhesive 56), the cover layer 50 substantially returns to its undeformed original shape (as seen in FIGS. 4 and 5). The outer face 52 of the cover layer 50 may also be a writeable surface. In addition, the outer face 52 of the cover layer 50 may bear indicia for aesthetics or advertising purposes (such as graphics which may be pre-printed on the cover layer 50), or to facilitate visually sorting the index cards 20. In one embodiment, that indicia includes a color (e.g., the entire outer face 52 of the cover layer may be coated with a layer of colorant such as green, blue or red) to make it distinctive relative to the front side 22 of the base layer 21 (which is typically white).

The adhesive 56 may be a permanent or repositionable pressure sensitive adhesive. The use of a repositionable pressure sensitive adhesive allows the index card 20 to be adhered to a mounting surface multiple times, and allows for the easy rearrangement of the relative positions of the index cards, which may be, for example, adhered upon a wall.

Essentially, the present invention provides a means for sticking and holding index cards on another surface "on demand".

For adhesion purposes, improved adherence appears to be attained when the paperless zone includes an open edge across which adhesive may be disposed (i.e., the edge gap 44). In other words, the paperless zone 42 is not surrounded on all sides by portions of the layer 21. The edge gap 44 provides an area of adhesive 56 which is spaced linearly from any edge or portion of the layer 21 having a thickness T, and thus facilitates the deformation of the cover layer 50 and the adherence of the adhesive 56 on the cover layer 50 to a mounting substrate surface.

Figure 9:
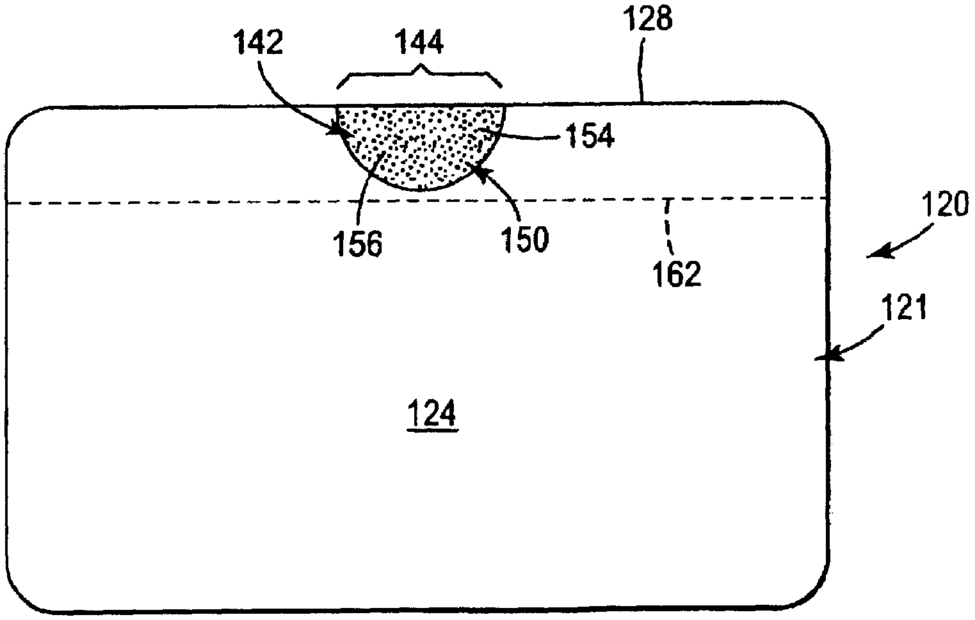
FIG. 9 illustrates a second embodiment of the present invention, as viewed from the back side of an index card.

The index card 20 of FIGS. 1-8 illustrates one embodiment of the present invention. FIGS. 9-17 illustrate alternative embodiments. In FIG. 9, a note card 120 is constructed with a base layer 121 otherwise the same as the note card 20, but has a paperless zone 142 which is smaller in area and shaped differently, although still presenting an edge gap 144 along an upper edge 128 of the base layer 121. In FIG. 9, the paperless zone 142 is illustrated as a semicircle or near semicircle, and is viewed from a back side 124 of the index card 120. A cover layer 150 is provided on a front side of the index card 120, and a pressure sensitive adhesive 156 on a back face 154 of the cover layer 150 is visible through the paperless zone 142. A bottom edge 162 of the cover layer 150 is illustrated by the dashed lines in FIG. 9.

Figure 10:
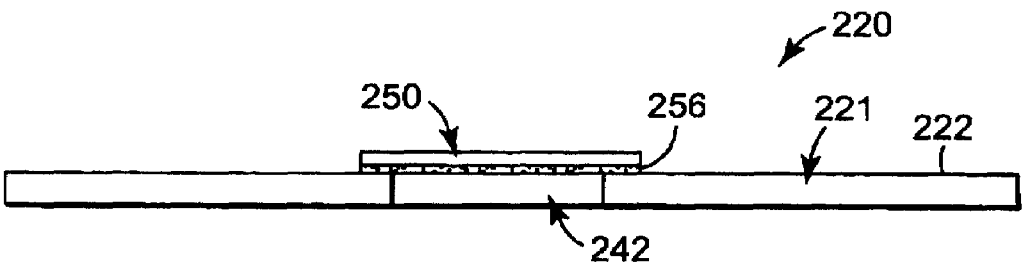
FIG. 10 illustrates a third embodiment of the present invention, as viewed from the top of an index card.
Figure 11:
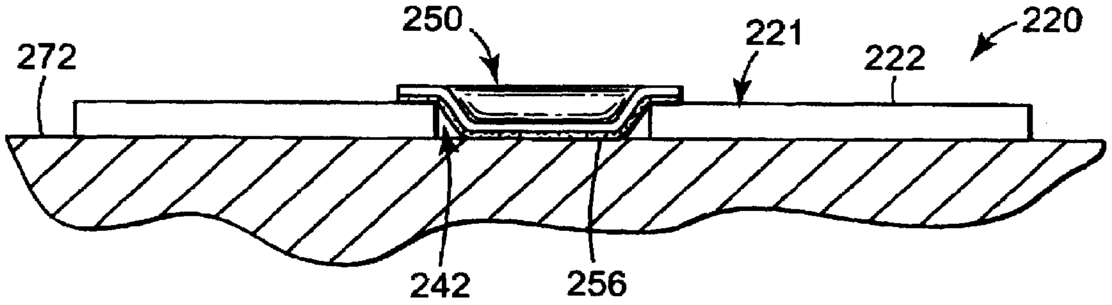
FIG. 11 illustrates the index card of FIG. 10, as adhered to a substrate surface.

FIG. 10 illustrates yet another embodiment of the present invention, in the form of a note card 220. Other than the difference in the form of its cover layer 250, the note card 220 is similar in construction to the note card 120 of FIG. 9. FIG. 10 shows the note card 220, as viewed from the upper edge thereof. The base layer 221 has a paperless zone 242 thereon, with the cover layer 250 adhered to a front side 222 of the layer 221 by pressure sensitive adhesive 256. The cover layer 250 does not extend across the entire front face 222 of the base layer 221 but only slightly overlaps the edges of the paperless zone 242 (enough overlap to facilitate bonding of the cover layer 250 to the base layer 221). FIG. 11 illustrates the index card 220 with the cover layer 250 deformed to bring the adhesive 256 thereon into adhering engagement with a mounting substrate surface 272.

Figure 12:
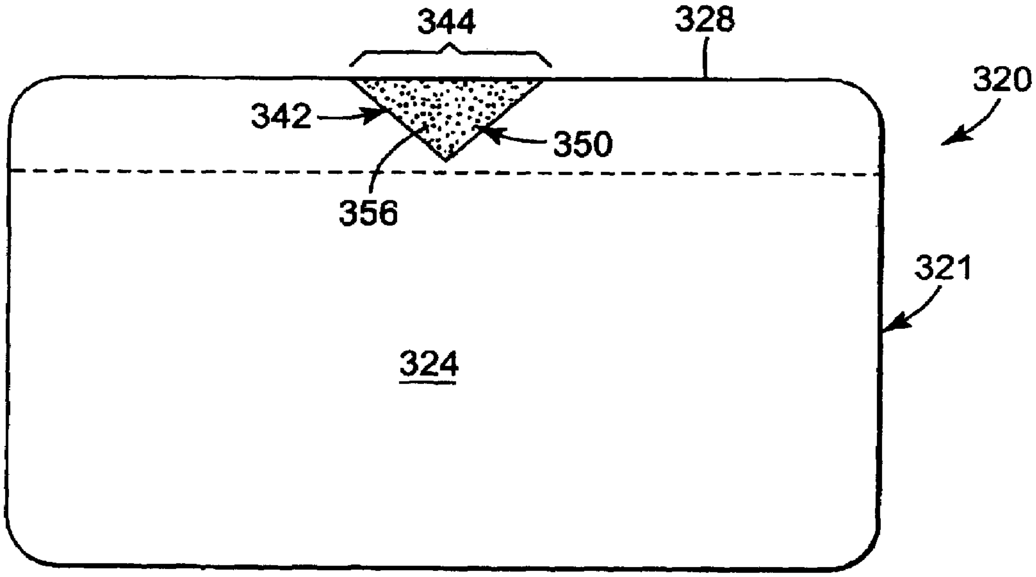
FIG. 12 illustrates a fourth embodiment of the present invention, as viewed from the back side of an index card.

FIG. 12 illustrates yet another form of inventive index card 320, having an alternatively shaped paperless zone 342. Other than the shape of the paperless zone 342, the index card 320 has the same attributes as the index cards 20, 120 and 220 disclosed above. In the index card 320, a base layer 321 has a paperless zone 342 which is V-shaped. As with previous embodiments, however, the paperless zone has an edge gap 344 exposed along an upper edge 328 of the base layer 321. A cover layer 350 is adhered to a front side of the base layer 321 by pressure sensitive adhesive 356, with the adhesive 356 visible (and operable) via the paperless zone 342, as viewed from a back side 324 of the index card 320 in FIG. 12.

Figure 13:
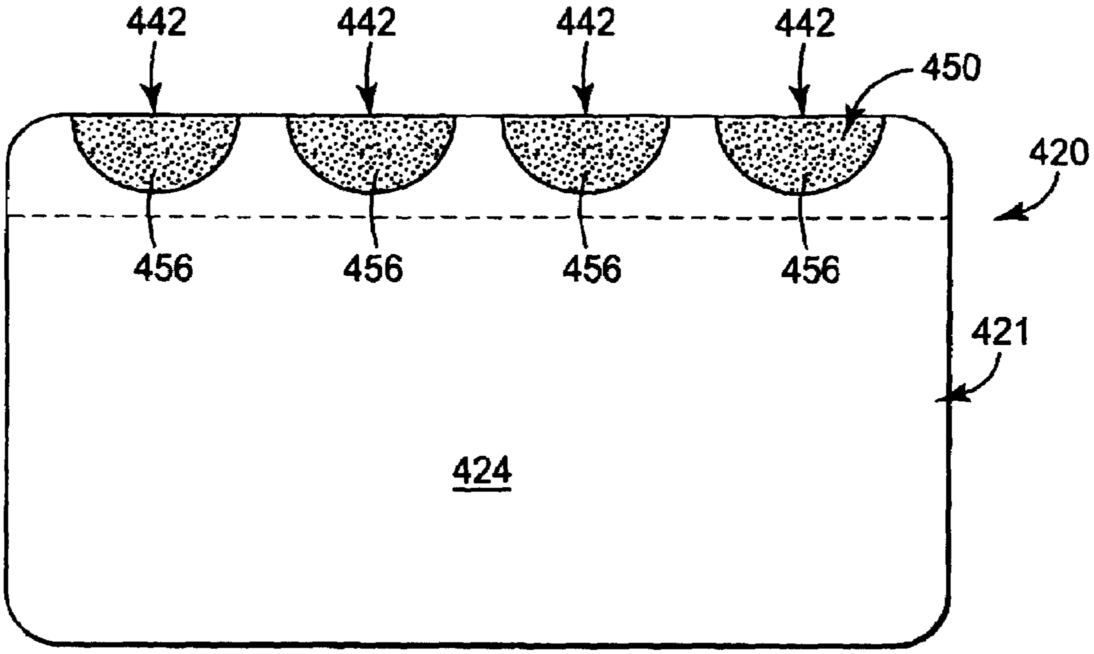
FIG. 13 illustrates a fifth embodiment of the present invention, as viewed from the back side of an index card.

FIG. 13 illustrates another embodiment of an inventive index card 420. Other than the form of the paperless portions of the index card 420, this embodiment has the same attributes as the index cards 20, 120, 220 and 320 disclosed above. In this embodiment, a plurality of paperless zones 442 are provided along an upper edge 428 of a base layer 421 of the index card 420. A cover layer 450 extends across a front face of the layer 421 such that pressure sensitive adhesive 456 is exposed across each of the paperless zones 442.

As can be appreciated, the shape of the paperless zone on an index card assembly of the present invention can take many forms, and there can be multiple exposed adhesive zones. While the shape or shapes of the paperless zone(s) may be defined in part by ornamental considerations, each paperless zone is formed to provide an edge gap across the upper edge, side edges or bottom edge of the index card of sufficient distance that the cover layer can be deformed against a mounting surface and not be unduly constrained in that deformation by a nearby thickness of a portion of the base layer of the index card. On the other hand, when the cover layer is not deformed by an application of sufficient pressure, the adhesive is spaced from (i.e., recessed into) the back side of the index card.

Figure 14:
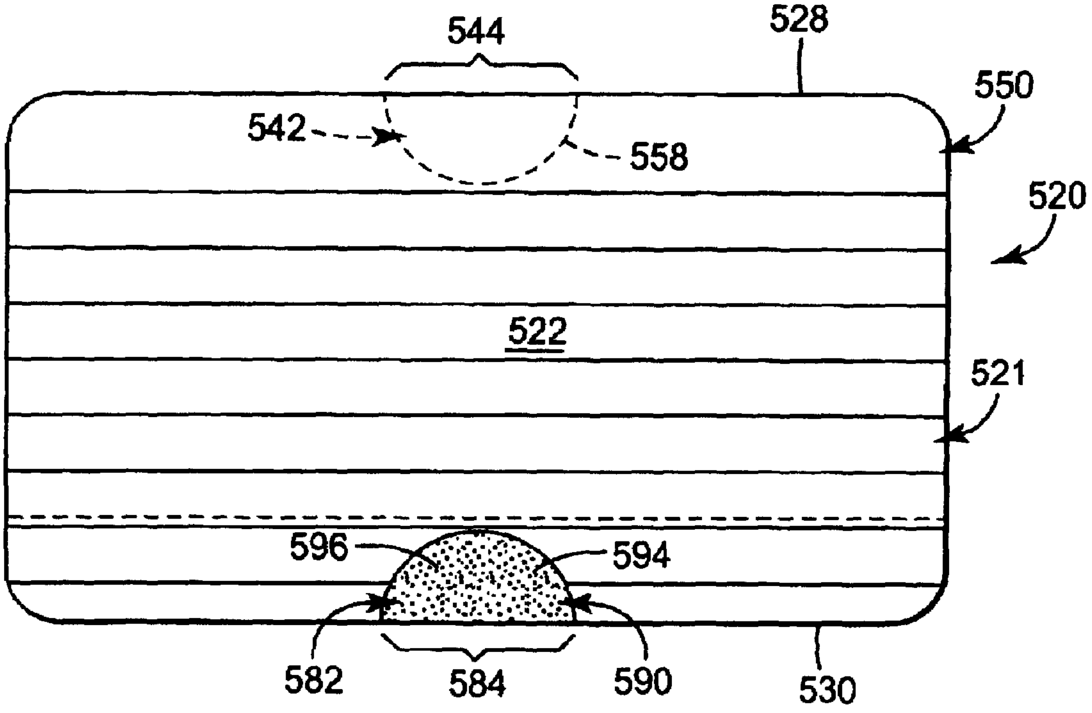
FIG. 14 illustrates a sixth embodiment of the present invention, as viewed from the front side of an index card.

In the embodiments of the present invention discussed above, only one side of the index card assembly is selectively self-adhereable to a mounting surface using recessed and exposed adhesive. In an index card 520 embodiment illustrated in FIG. 14, both sides of the index card may be so mounted. The index card 520 illustrated in FIG. 14 has a base layer 521 with a cover layer on each of its major sides, adjacent top and bottom edges thereof. FIG. 14 illustrates a front side 522 of the base layer 521 of the index card 520, with a cover layer 550 adhered thereto, adjacent upper edge 528. A paperless zone 542 adjacent the upper edge 528 is illustrated by dashed lines 558 and defines an edge gap 544 across the upper edge 528. Pressure sensitive adhesive is thus exposed on a back face of the cover layer 550, across the paperless zone 542. In addition, a second paperless zone 582 is removed adjacent a lower edge 530 of the base layer 521. The second paperless zone 582 also defines a second edge gap 584 across the lower edge 530 of the base layer 521. A second cover layer 590 is formed similar to the cover layer 550, and has a back face 594 adhered to a back side of the base layer 521 by pressure sensitive adhesive 596. The adhesive 596 is thus exposed on the front side 522 of the base layer 521, across the second paperless zone 582. As a result, the index card 550 can be adhered to a substrate surface on either its front side or its back side. When not adhered, the thickness of the base layer 521 spaces the exposed adhesive on both sides of the index card 520 from adjacent abutting surfaces, thereby allowing the index card to be freely moved about, stacked or reshuffled. Other than the addition of an oppositely facing area of exposed adhesive, the index card 520 of this embodiment has the same attributes as the index cards 20, 120, 220, 320 and 420 discussed above.

Figure 15:
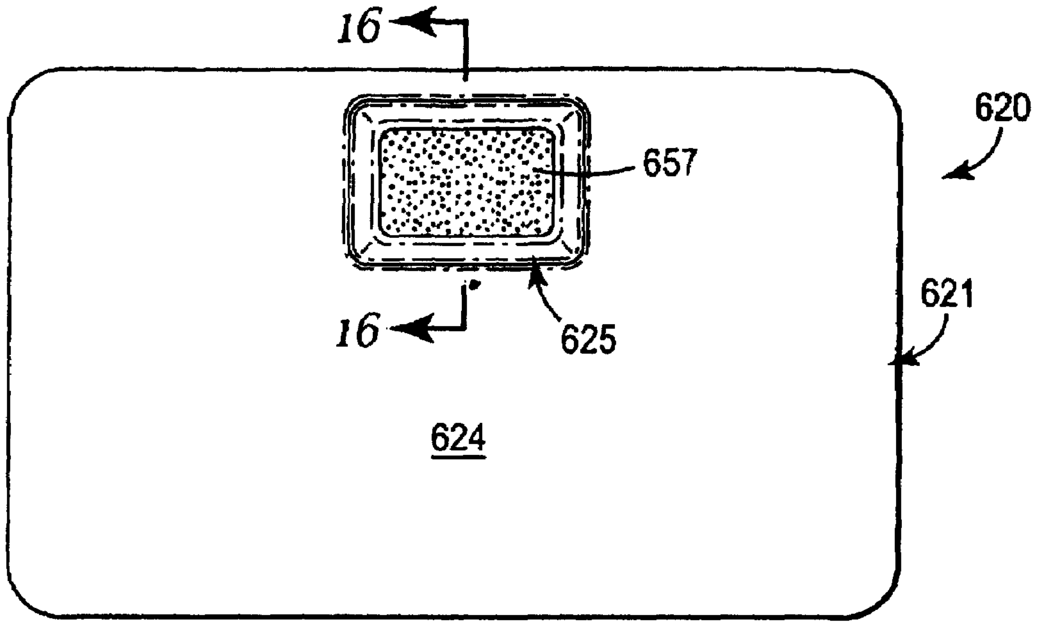
FIG. 15 illustrates a seventh embodiment of the present invention, as viewed from the back side of an index card.
Figure 16:
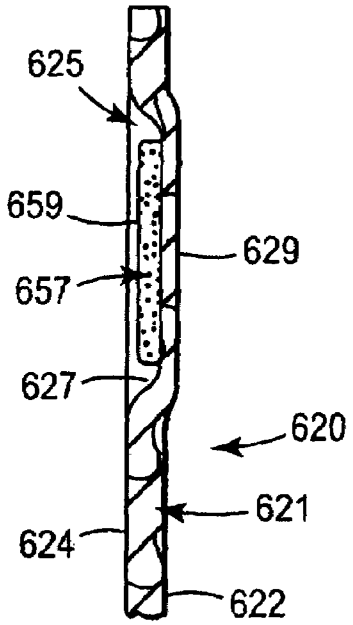
FIG. 16 is a sectional view as taken along lines 16-16 in FIG. 15.
Figure 17:
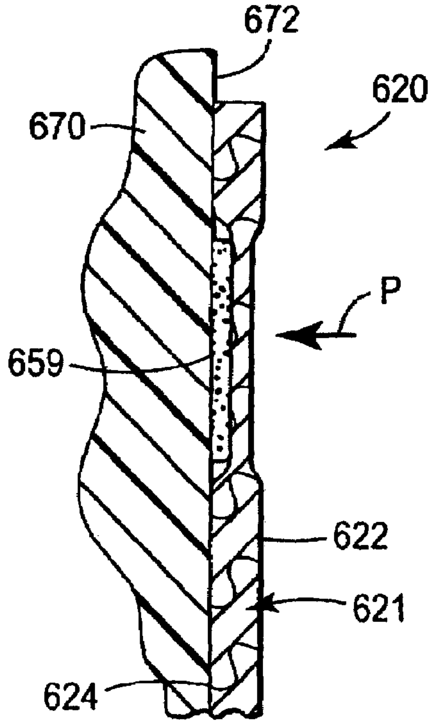
FIG. 17 is a sectional view of the index card of FIG. 16, showing its adherence to a vertical substrate surface.

FIGS. 15-17 illustrate another embodiment of an inventive index card. In this embodiment, index card 620 has a base layer 621, but the base layer 621 does not necessarily have a paperless zone or associated cover layer. An area or land 625 is embossed in the base layer 621 to create a recess 627 on a back side 624 thereof (see FIG. 16). The embossed area 625 may be formed so that an opposite area on a front side 622 of the base layer 621 has no surface discontinuities, or it may be formed so that a slightly raised area 629 is formed on the front side 622.

A layer of pressure sensitive adhesive 657 (like the adhesives disclosed above) is disposed in the recess 627. However, an exposed surface 659 of the adhesive 657 is spaced from the back side 624 of the base layer 621 so that the adhesive 657 does not engage a surface which is merely in abutting engagement with the back side of 624. The index card 620 is caused to be adhered to a substrate 670 having a mounting surface 672 (FIG. 17) by the application of a threshold level of pressure against the front side 622 of the base layer 621, opposite the adhesive 657. The embossed area 625 of the base layer 621 stretches slightly under this pressure, illustrated as pressure P in FIG. 17, to bring the exposed face 659 of the adhesive 657 into abutting engagement and adherence with the mounting surface 672. The base layer 621 is flexible enough to allow such stretching and maintain the shape illustrated in FIG. 17 so that the index card 620 remains adhered to the substrate 670 (e.g., a wall, countertop, paper sheet, etc.). The embossed area 625 thus acts as a "pushbutton" for activating adherence of the index card 620 to the substrate 670. The embossed area 625 can be formed so that once the index card 620 is peeled away from the substrate 670, the embossed area 625 returns to its original recessed position (FIG. 16) or remains pushed out toward the back side 624 of the base layer 621. In this latter instance, a user can then "pop" or "snap" the embossed area 625 back to its original recessed position (FIG. 16) like an on/off switch. The index card 620, although differing in some construction elements from the other embodiments disclosed herein, has the same functional attributes. For example, it can be stacked and shuffled free without unintended adherence to other cards or surfaces.

As noted above, a number of variations can be made to the design of an inventive index card assembly without sacrificing utility. One specific example of an index card of the present invention would be a 3×5 inch card made of card stock. The card stock is 90 pound weight paper, which is 0.0075 inches thick. The corners are rounded with a 0.25 inch radius. The index card has printed blue lines on its front side for writing spaced horizontally across the longer dimension (5 inch dimension of the index card). The paperless zone along the upper edge of the index card is centered and has an edge gap (L) of approximately 2 inches. The paperless zone has a depth (D) of 0.438 inches, and has rounded interior corners of 0.50 inch radius, assuming a shape similar to that illustrated in FIGS. 1 and 2. A 0.5 inch wide film adhesive tape strip is adhered to the front side of the index card adjacent the upper edge thereof and over the paperless zone and edge gap. The film and adhesive construction used is the number 811 repositionable tape product available from 3M Corporation, St. Paul, Minn. The tape strip is formed of acetate, which is about 0.0016 inches thick, and has a coating of microsphere adhesive, coated to a depth of 0.0004 inches thick. The exposed adhesive on the back face of the film is recessed by the thickness of the card stock (0.0075 inches) from the back side of the index card. On a front face of the film, it is printed with a color coating, for use in end user sorting of the index cards.

Although the present invention has been described with reference to preferred embodiments, workers skilled in the art will recognize that changes may be made in form and detail without departing from the spirit and scope of the invention.

The invention claimed is:

1. An index card assembly comprising:

a paper layer having (i) opposing writable front and back sides and (ii) upper and lower edges, the upper edge having a portion of the paper removed to define a paperless zone that includes a gap across the upper edge and the lower edge having a portion of the paper removed to define a second paperless zone that includes a second gap across the lower edge;

a cover layer having an outer face and an inner face, the cover layer having pressure sensitive adhesive disposed on its inner face, with the cover layer adhered thereby to the front side of the paper layer to cover the paperless zone in an alignment where a top edge of the cover layer extends across the gap of the paperless zone and the adhesive on the inner face of the cover layer is exposed across the paperless zone on the back side of the paper layer; and a second cover layer having an outer face and an inner face, the second cover layer having pressure sensitive adhesive disposed on its inner face, with the cover layer adhered thereby to the back side of the paper layer to cover the second paperless zone in an alignment where a bottom edge of the second cover layer extends across the second gap of the second paperless zone and the adhesive on the inner face of the second cover layer is exposed across the second paperless zone on the front side of the paper layer.

* * * * *